United States Patent [19]

Lindal

[11] 4,034,512
[45] July 12, 1977

[54] DOOR CONSTRUCTION

[76] Inventor: Walter Lindal, 3764 SW. 171 St., Seattle, Wash. 98166

[21] Appl. No.: 605,530

[22] Filed: Aug. 18, 1975

[51] Int. Cl.$^2$ .......................................... E06B 3/00
[52] U.S. Cl. .................................. 49/501; 16/135; 16/159; 52/582; 52/629
[58] Field of Search ............... 49/501; 16/159, 167, 16/135; 52/629, 621, 622, 582, 587; 428/223

[56] References Cited

U.S. PATENT DOCUMENTS

| 1,091,584 | 3/1914 | Miller | 16/167 |
| 1,903,059 | 3/1933 | Meininghams | 16/135 |
| 2,516,329 | 7/1950 | Maxey | 52/629 |

FOREIGN PATENT DOCUMENTS

| 113,223 | 2/1918 | United Kingdom | 16/159 |

Primary Examiner—Kenneth Downey
Attorney, Agent, or Firm—Wenderoth, Lind & Ponack

[57] ABSTRACT

A door is fabricated from wooden boards arranged edge to edge in a layer and secured together by metal strips having fasteners in the form of integral nail-like projections. The strips extend horizontally of the door to one vertical edge thereof, and include integral hinge means for mounting the door. The door may have two layers of boards with the strips sandwiched between the two layers and fastened to both of them.

7 Claims, 5 Drawing Figures

DOOR CONSTRUCTION

FIELD OF INVENTION

This invention relates to improvements in the construction of doors, particularly weatherproof doors for use in the external walls of buildings.

SUMMARY OF THE INVENTION

According to the invention, there is provided a door comprising a layer formed from a series of elongate vertical planks said planks being arranged in abutting side-by-side relationship and the planks being secured together by meal strips extending in the plane of a major surface of said layer, said strips including fastner means in the form of series of integral nail-like projections extending from the strips substantially normal to the said plane and embedded in the planks of said layer, said strips extending to a lateral edge of the door and defining hinge means for mounting said door in a frame to pivot on an axis parallel to said edge.

The door may comprise two layers of boards arranged in overlying relationship, the joints between the boards in one layer being laterally offset with respect to the joints in the other layer. In this case, the metal strips are sandwiched between the two layers and have projections extending from both sides thereof to secure the layers together.

The individual boards of a layer, and the layers themselves, may also be secured together by means of a non-hardening glue such as can accommodate slight movement of the boards which occur through shrinkage and expansion of the wood. The abutting edges of the boards may be of stepped, overlapping configuration, to improve the weather-resistance of the door.

BRIEF DESCRIPTION OF THE DRAWINGS

The invention will further be described, by way of example only, with reference to the accompanying drawings, in which.

DESCRIPTION OF THE PREFERRED EMBODIMENTS

Figure 2:
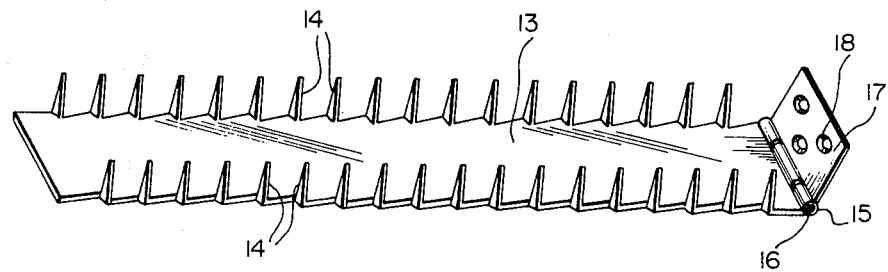
FIG. 2 is an enlarged perspective view of a metal strip with integral hinge used in the door of FIG. 1.
Figure 1:
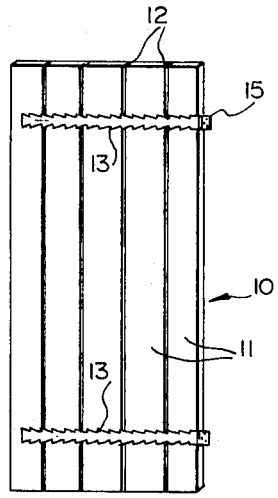
FIG. 1 is illustrates a door constructed in accordance with the invention from a single layer of boards.

Referring to FIGS. 1 and 2, a door 10 comprises a single layer formed of wooden boards 11 arranged in abutting edge-to-edge relationship. The boards 11 have their adjacent edges formed to overlap through shiplap joints as indicated at 12. Alternatively, the adjacent edges of the boards 11 may be formed with tongue and groove joints, or otherwise formed in overlapping relationship to improve the weather resistance of the door. The joints between the boards are filled a heavy bodied, non-hardening, rubberlike glue which will maintain the integrity of the seal despite minor movements of the adjacent boards through shrinkage or expansion of the wood.

The boards 11 are secured together by means of two vertically spaced horizontally arranged steel strips 13 positioned against one face of the door. As best seen in FIG. 2, the strips 13 are of uniform thickness, and a fastening means in the form of a series of integral nail-like projections 14 extends along the upper and lower edges thereof. The projections 14 are fabricated by forming a series of slits along the edges of the strip, and then bending the projections 14 from the plane of the strip to project at right angles thereto. A hinge structure 15 is integral with one end of the strip 13, the latter forming one leaf of the hinge and carrying a hinge pin 16 upon which the second leaf 17 is pivotally supported, the latter being provided, in known manner, with countersunk holes 18 to receive screws for fastening the hinge to a door frame.

Figure 4:
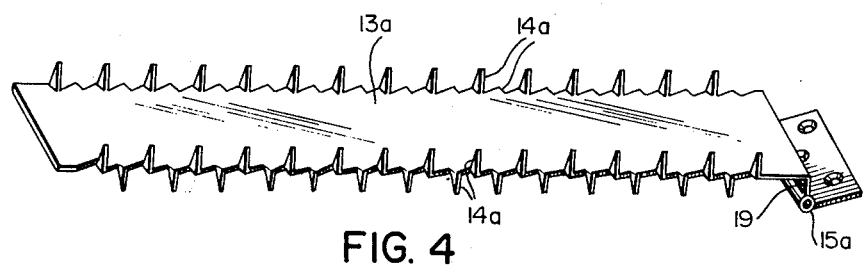
FIG. 4 is an enlarged perspective view illustrating a metal strip with integral hinge used in the door construction of FIG. 3.
Figure 3:
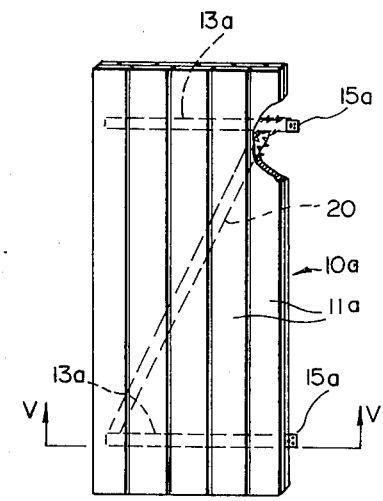
FIG. 3 illustrates an alternative door construction utilizing two layers of wooden boards.
Figure 5:
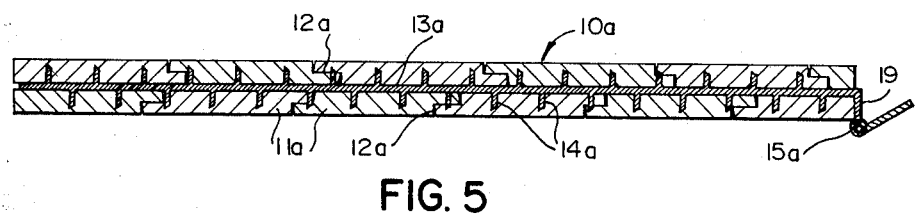
FIG. 5 is an enlarged sectional view taken on the line V—V in FIG. 3.

Referring to FIGs. 3 to 5, the door 10a comprises boards 11a arranged in two overlying layers. The boards of the individual layers, and the layers themselves, are secured together by steel strips 13a sandwiched between the two layers. As before the joints 12a between the boards are of shiplap configuration, and sealed by means of non-hardening rubber-like glue.

As shown in FIG. 4, each strip 13a is of a similar form to the strip 13 shown in FIG. 2, except that it has integral nail-like projections 14a which extend alternately in opposite directions from the plane of the strip. As before, the strip 13a includes an integral hinge structure 15a, the end of the strip having an angled section 19 adjacent the hinge. In the assembled door, the strips 13a are arranged horizontally at vertically spaced locations, and are interconnected by a diagonally arranged reinforcing strip 20 which is likewise provided with fastener means similar to the projections 14a. Thus, the two strips 13a and the diagonal reinforcing strip 20 have a Z-shaped configuration in the finished door. Since these strips 13a and 20 are sandwiched between the two layers of boards, they are not visible in the finished door, except for the hinge structures 15. The angled section 19 of the hinge offset the hinge pin 16a from the plane of the strip 13a to a position slightly beyond the exterior surface of the door, as best seen in FIG. 5, and in a similar position to the hinge pin 16 in the door 10 shown in FIG. 1.

The configuration of the joints 12a between the boards, as well as the use of rubber-like glue, provides a door which is substantially weatherproof. This effect is enhanced by the transversely offset relationship of the joints 12a between the boards of one layer, with respect to the joints in the other layer, as best seen in FIG. 5.

The door construction as described above offers significant advantages with respect to the speed and simplicity with which doors may be assembled. The boards or planks are simply laid into a press, the strips 13 or 13a are suitably positioned, and the press is closed, thus piercing the projections 14 or 14a into the boards 12 or 12a. This single operation provides a door which is complete except for finishing of the lock-side edge, and ready to be hung. Since the door is pre-hinged, it can be more readily hung or installed. The positions of the hinge pins are true, and upon installation all that is required is to plumb the jamb and stop and set the door butts.

It will be apparent that the double layer doors shown in FIG. 3 will have a clean finish on both sides, and no nails, screws, or dowels will be visible. The single layer door shown in FIG. 1 has a clean finish on one side, and even on the side where the strips 13 are installed, the appearance of the door can be enhanced by utilizing strips which have a decorative configuration.

What I claim as my invention is:

1. A door comprising a layer formed from a series of elongate vertical planks said planks being arranged in abutting side-by-side relationship and the planks being secured together by metal strips extending throughout the width of said layer in the plane of a major surface of said layer and contacting said planks in face-to-face engagement, said strips including fastener means in the form of series of integral nail-like projections extending from the strips substantially normal to the said plane and embedded in the planks of said layer, said strips extending to a lateral edge of the door and defining integral hinge means for mounting said door in a frame to pivot on an axis parallel to said edge.

2. A door according to claim 1 wherein two such layers are provided in overlying relationships, the metal strips being sandwiched between said layers and having nail-like projections extending from opposite sides thereof and embedded in both said layers to secure the planks and layers together.

3. A door according to claim 2 wherein two such strips are provided, extending parallel to the upper and lower edges of the door said strips being of steel and said fastener means comprising a series of spikes formed along opposite edges of each strip and bent normal to the plane thereof in opposite directions, each said strip including an integral hinge plate at said lateral edge, said integral hinge plate providing a pivotal mounting for a second hinge plate adapted for mounting on a door frame.

4. A door according to claim 2 wherein the abutting edges of the planks of each layer engage through tongue-and-groove or shiplap joints.

5. A door according to claim 2 wherein the joints between adjacent planks in one layer are laterally offset with respect to the joints in the other layer and thus are covered on one side by the boards of the other layer.

6. A door according to claim 3 including a diagonally arranged steel strip such that steel strips are arranged in an overall Z-shaped configuration.

7. A door according to claim 2 wherein the boards of each layer, and the layers themselves, are secured together by a rubber-like non-hardening glue which can accommodate minor movements caused by expansion and contraction of the wood.

* * * * *